United States Patent [19]
Vasby

[11] Patent Number: 5,404,696
[45] Date of Patent: Apr. 11, 1995

[54] AQUATIC-WEED REMOVAL MACHINE

[76] Inventor: Oscar A. Vasby, W9304 Hwy. 12, Cambridge, Wis. 53523

[21] Appl. No.: 138,867

[22] Filed: Oct. 20, 1993

Related U.S. Application Data

[63] Continuation-in-part of Ser. No. 836,217, Feb. 10, 1992.

[51] Int. Cl.$^6$ ............................................. A01D 44/00
[52] U.S. Cl. ................................................. 56/9; 56/8
[58] Field of Search ................................. 56/8, 9, 364

[56] References Cited

U.S. PATENT DOCUMENTS

| 4,520,616 | 6/1985 | Stewart et al. | 56/9 |
| 5,083,417 | 1/1992 | Jeronimidis et al. | 56/9 |

FOREIGN PATENT DOCUMENTS

| 2040923 | 10/1992 | Canada | 56/9 |

*Primary Examiner*—George A. Suchfield
*Attorney, Agent, or Firm*—Keith Schoff

[57] ABSTRACT

An aquatic-weed removing machine is provided with a paddle wheel equipped with a hinged plate connected to the peripheral edge of each paddle in a manner such that as the wheel rotates, individual plates pivot from an inward folded position at the edge of the paddles to a radially extended one, falling downward by gravity as the wheel sequentially places the paddles in the lower forward quandrant of their cycle. By a combination of centrifugal force and weight, the plates are thrown into pressing contact with the top of an underlying, tangentially moving conveyor belt upon which uncut weeds are laid by forward motion of the machine in the water, causing the weeds to be tightly held on the belt and to be pulled out by the roots as both the belt and the machine continue in their directions of motion.

7 Claims, 3 Drawing Sheets

AQUATIC-WEED REMOVAL MACHINE

CROSS-REFERENCE TO RELATED APPLICATIONS

This application is a continuation-in-part of my application Ser. No. 07/836,217, filed Feb. 10, 1992.

FIELD OF ART

Thick aquatic growth in bodies of water impedes navigation, interferes with recreational use, and produces objectionable odors when the growth decays.

BACKGROUND OF INVENTION

Aquatic weed cutting machines are known in which powered cutting implements, located at the submerged, forward end of an endless conveyor elevator mounted on a barge or pontoon craft, cut weeds below the water surface, with the severed portion of the growth being removed by the conveyor, but without the roots or lower portion of the stalk being destroyed.

SUMMARY OF THE DISCLOSURE

An endless conveyor elevator tangentially underlying an associated paddle wheel, together with synchronized drive gearing, are mounted as a structural unit on a watercraft in a manner which enables the submerged front of the unit to be raised and lowered arcuately about a rearward, horizontally transverse axis of a stationary pivot mounting structure fixed to the watercraft. Each paddle is of the paddle wheel is provided with a peripherally hinged extension which, when propelled by gravity and centrifugal force when the paddle traverses the bottom portion of its rotation, falls downward into pressing contact with the conveyor together with any weed growth which water surge and craft movement lay upon it. Continued movement of the mechanisms, and of the craft through the water cause the roots of the weed growth on the conveyer to be pulled out of the lake bed and be permanently removed from the body of water. The watercraft may be provided with supplemental propulsion although the paddle wheel alone will propel the craft. The conveyor is preferably of perforated or open mesh construction.

DESCRIPTION OF THE INVENTIVE EMBODIMENT

Figure 1:
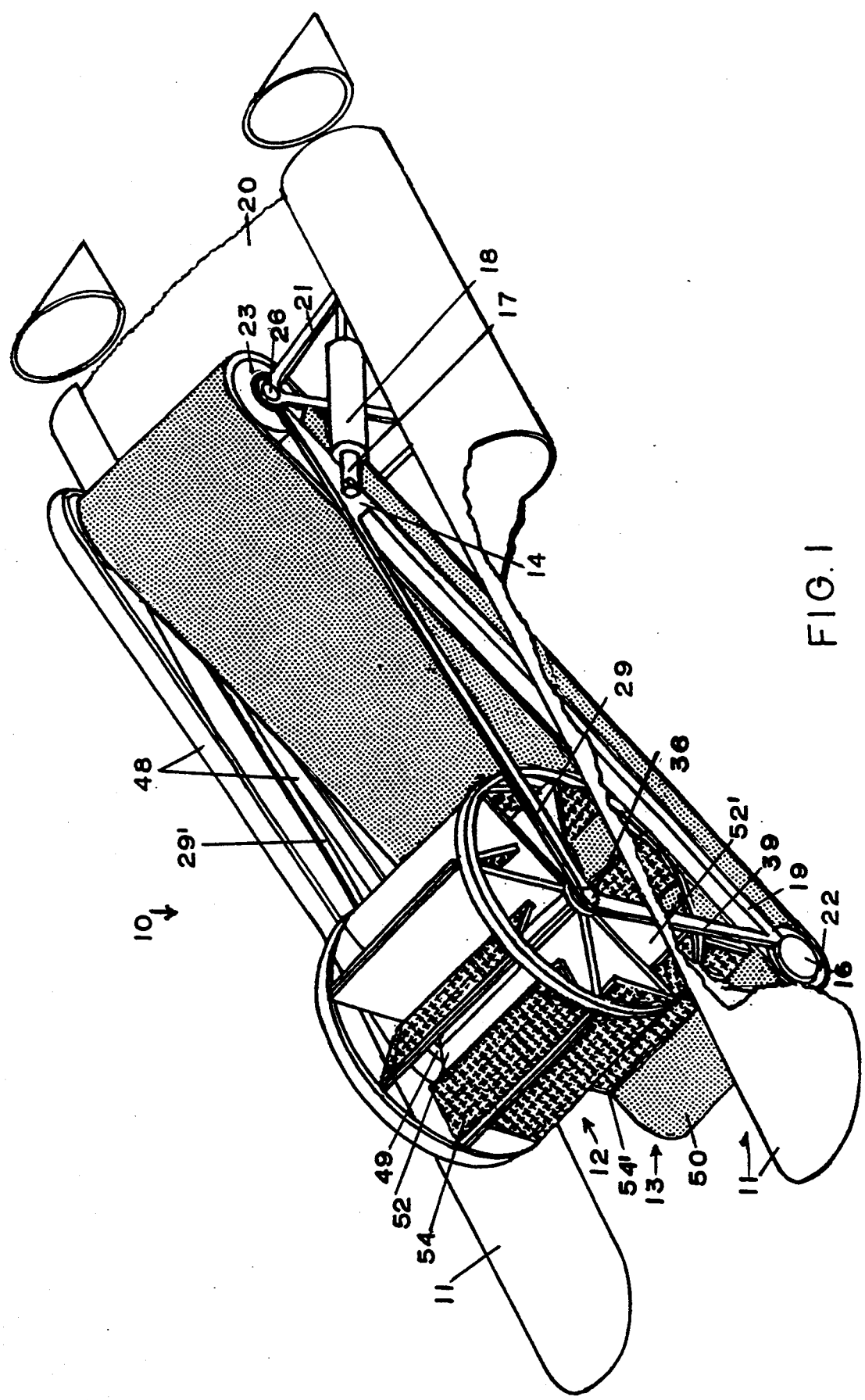
FIG. 1 is a perspective view in partial section of an embodiment an aquatic growth removal machine of this invention.
Figure 3:
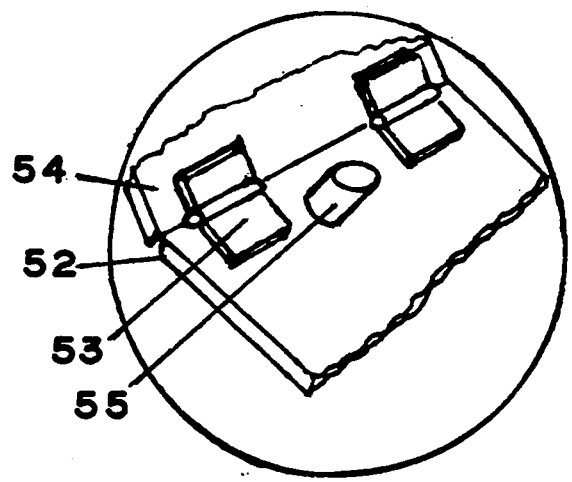
FIG. 3 is a perspective view of a detail of a paddle of the machine FIG. 1.
Figure 2:
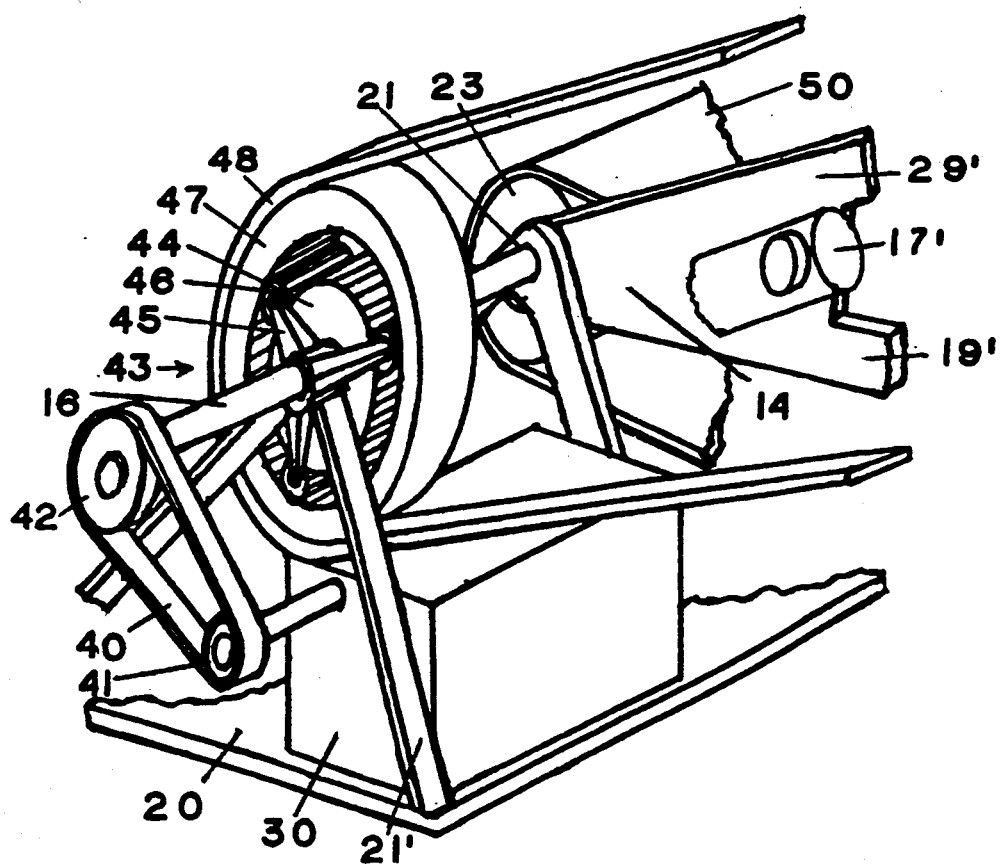
FIG. 2 is a perspective view in partial section of drive gearing of the machine of FIG. 1.

In FIGS. 1-3, aquatic weed harvester 10 floats in water on pontoons 11 affixed laterally outboard of a structural sub-unit comprising paddle wheel 12, elevator conveyor 13 and supporting framework 14 in a manner which enables the structural sub-unit to be moved arcuately about a transverse axis coincident with drive shaft 16, Hydraulic or pneumatic rams 17, 17' (FIGS. 1, 2) are operably connected for pivotally raising and lowering framework 14 with respect to the portion of machine 10 which is rigidly affixed to pontoons 11, and to which cylinder 18 is anchored. Framework 14 mounts bearings carrying axles 26, 16, 36, respectively, of mounting rollers 22, 23, and of paddle wheel 12. Chord members 19, 19' of framework 14, are preferably cross-braced laterally one to the other to increase rigidity of the framework.

Deck 20 and mounting standards 21, 21' are unitarily fixed to pontoons 11 with the deck area rearward of the conveyor providing a platform on which to pile harvested weeds.

Conveyor belt 50 preferably comprises woven, perforated, or screen construction with openings which offer minimum impedance to passage of water draining from the belt while being small enough to retain harvested growth. A continuous-web conveyor belt for harvesting algae, fine particulate material, or supernatant liquid which may be absorbed on the conveyer belt, may be used, but such use is at the expense of loss of propulsion from operation of paddle wheel 12. Auxilliary propulsion means, for example, an outboard motor, may be provided, if desired.

As shown in FIG. 2, operational power for conveyor 13 and paddle wheel 12 is provided by an internal combustion engine, concealed from view within housing 30, and a power train comprising drive pulley 41, belt 40, and driven pulley 42, with driven pulley 42 being affixed to drive shaft 16 together with sun gear 44 of planetary transmission 43, and drive roller 23 of conveyor 13. Conveyor belt 50 is driven by roller 23, and paddle wheel 12 is driven in a reverse direction of rotation from drive shaft 16 and roller 23 by use of planetary transmission 43. Alternatively, power take-off for driving the paddle wheel from drive shaft 16 may be operably made using a pair of meshed spur gears, one being a driving gear fixed to the drive shaft and the other a driven gear carrying a drive pulley, but such means are not shown. Spider 45 of planetary transmission 43 is fixed to mounting standard 21' carrying for operable rotation planet gears 46. Planet gears 46 are disposed in meshed engagement with sun gear 44 and the internal teeth of ring gear 47. As shown in FIGS. 1 and 2, endless power transmission belt 48 is trained on the outer, pulley-face, of ring gear 47 and on driven pulley 49 affixed to the hub of paddle wheel 12 for driving the wheel in rotation. Alternatively, if desired, either of power transmission belts 40, 48 may be replaced with drive chains, and the associated pulleys 41, 42, 49, and the outer, pulley-face, of ring gear 47 be replaced with chain sprockets. The effective diametric ratios of the components of planetary gear transmission 43, roller 23, pulley 49, and paddle wheel 12 are such as to provide synchronized, uniform velocity for linear travel of conveyor belt 50 and angular travel of paddle wheel 12.

As shown in FIG. 3, paddle blade 52 of paddle wheel 12 is provided with hinges 53 mounting rectilinear plate 54 in a manner which positions it along the full width of paddle blade 52 (FIG. 1) at the peripheral edge of the paddle blade for enabling plate 54 to be rotated from an infolded position abutting mechanical stop 55 fixed on paddle blade 52 to a position of a rectilinear, radial extension of paddle blade 52, as shown for plate 54' of paddle blade 52' in FIG. 1. Plate 54 is rotated outward from paddle blade 52 during rotation of paddle wheel 12 by centrifugal force and by gravity when paddle blade 52 approaches the bottom quandrant of its rotation. Water surge from forward motion of machine 10 opposes the forward flinging motion of plate 54 into radial extension from paddle blade 52, so that it is preferred that plate 54 comprise a relatively heavy, open-face construction such as coarse screening or expanded metal sheet to maximize inertia and minimize resistence to water passing through the plate.

Top-rear rails 29, 29' of framework 14 are integrally joined, respectively, to top-front rail 39 (and the companion top-front rail, not shown) providing operable mounting for paddle wheel 12. Rams 17, 17' are actuated to undergo unitary movement in raising and lowering framework 14 arcuately about its pivot axis to locate the front of conveyor 13 a submerged distance, preferably close to the bottom, which is proper for the depth of water being worked in to remove weed growth, by connection of cylinder 18 and its opposite side companion cylinder, not shown, to conventional pumps, hose connections, and controls, not shown, driven by the internal combustion engine which provides motive power for operating conveyor 13 and paddle wheel 12. A power source other than an internal combustion engine, such as a steam engine or other means, may be provided, as desired. Operation of machine 10 serves to remove totally aquatic plants from bodies of water by pulling them up by the roots, rather than cutting the stalks and harvesting only the top portion of the plants, leaving the root structure and lower portion of the stalks to re-grow new tops in the manner of machines which use submerged cutting heads and the like to remove aquatic growth.

Pivotally mounted plate 54 on paddle blade 52 may be replaced by non-plate means such as a battery of flails which rotate about an axis common to all, but independently one from another, or by other independently rotatable means ganged to turn about a single axis. In a non-preferred variation, hinges 53 may be spring loaded to urge the hinges to fully opened position, thus positioning plate 54 of paddle blade 52, and the plates associated with other-blades of paddle wheel 12, in fully extended position reaching beyond the periphery of the paddle blades except when the plates are forced to rotate into an angular position by being brought into contact with conveyor 13 or the load carried on it, but such means are not shown. An advantage provided by such construction is that proper action of the plates in pressing harvested growth against conveyor belt 50 is not inhibited materially by slow rotation of paddle wheel 12 nor by the depth of submersion of paddle wheel 12 during operation of machine 10.

Figure 4:
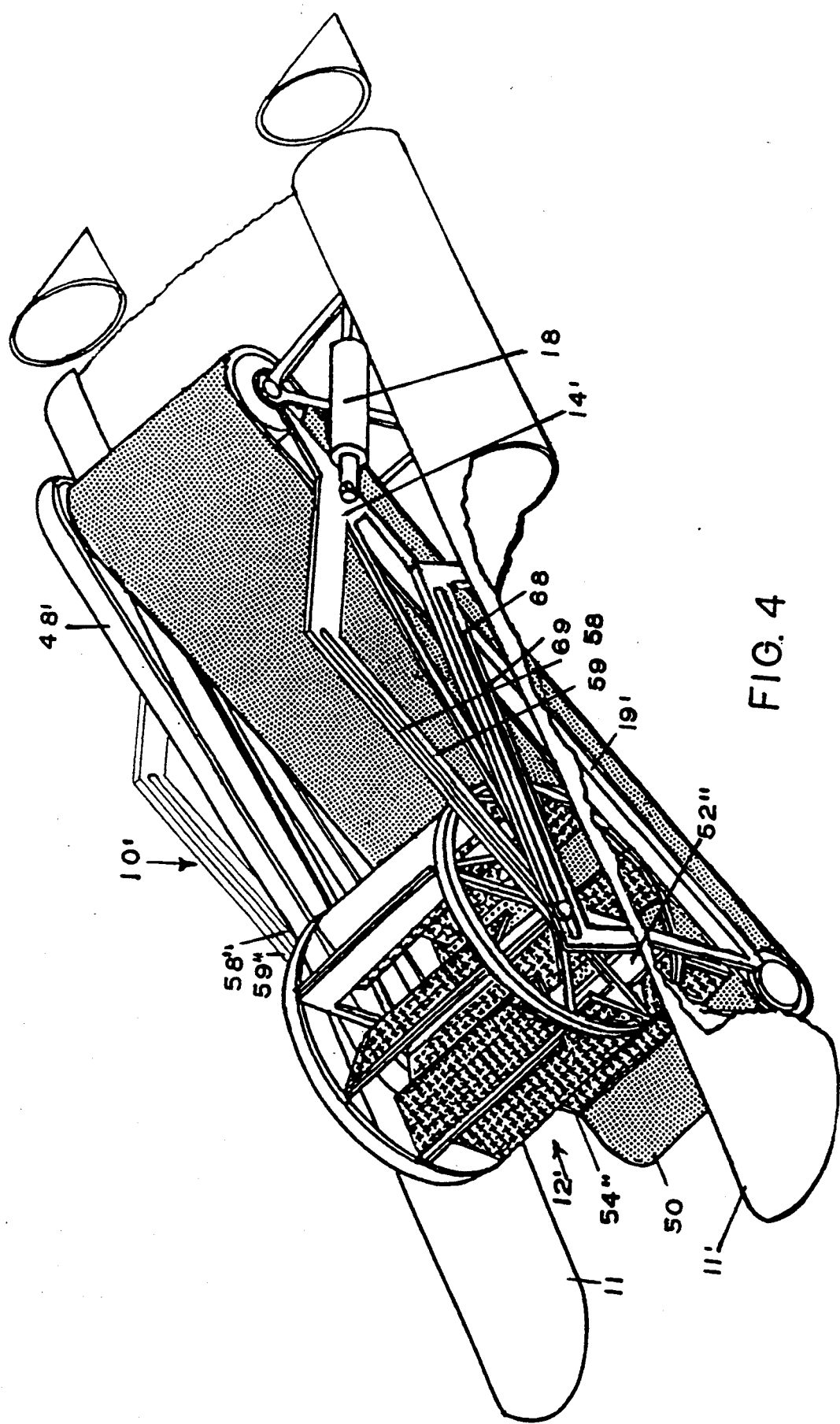
FIG. 4 is a perspective view of another embodiment of an aquatic growth removal machine of this invention.

In FIG. 4, weed harvester 10' is shown as another embodiment of the invention, differing principally from the embodiment of FIG. 1 in the construction of the paddle blades, particularly. Paddle wheel blade 52'' of FIG. 4 is configured as a slat disposed adjacent to the outer peripheral extremity of paddle wheel 12', rather than as a full radial depth panel in the manner of blade 52 of FIG. 1. Plate 54'' of paddle wheel 12'' preferably comprises a relatively stiff flap of unperforated, fabric-reinforced rubber, which is urged into pressing contact with conveyor belt 50 by the force of water surging over the inboard edge of paddle blade 52'' against plate 54'' when paddle wheel rotation initially immerses blade 52'' and drives it through the water. Application of such force against plate 54'' when it is in contact with aquatic growth laid on conveyor belt 50 prevents slippage from occuring between the material being harvested and the belt with the binding effect being enhanced by the removal of water pressure on the underside of the top run of the conveyor belt as water drains from the conveyor and its load as the belt rises above the water surface.

If desired, the mechanical drive train shown in FIG. 2 may be eliminated and be replaced with hydraulic pumps, restriction valves, hoses and drive motors, none of which is shown, in a manner well known in the art, for operating conveyor 13 or 13' and paddle wheel 12 or 12' of FIGS. 1, 4, as well as hydraulic rams 17, 17', with power being supplied by the internal combustion engine within enclosure 30. In addition, auxilliary propulsion means such as a supplemental stern mounted steerable paddle wheel or rudder together with associated hydraulic motors may similarly be provided and powered, but such means are not shown. If such means are not used in the embodiment of FIG. 4 and drive belt or chain 48' as shown is used, an idler pulley or sprocket is provided in well known manner on both the upper and lower runs of the belt or chain to take up slack in the belt or chain. Preferred is a double pulley or sprocket device of the type conventionally provided on bicycles using drive chain deraillers, Such means are concealed from view in FIG. 4. A single installation on the upper run of the drive belt or chain is adequate if paddle wheel 12' is not run in reverse direction.

For enabling framework 14' of the embodiment of FIG. 4 to be submerged more deeply in the water than is feasible with paddle wheel 12 and framework 14 of the embodiment of FIG. 1, paddle wheel 12' is mounted with the axle end bearings operably carried for movement in guideway slots 58, 58' of guide bar portions 59, 59', respectively, of framework 14', and outboard thereof, in guideway slots 68, 68' of guide bar portions 69, 69', respectively, of the portion of machine 10' which is rigidly fixed to pontoons 11, 11'. Paddle wheel 12', thus mounted for undergoing translational movement with respect to framework 14', rather than being fixedly positioned with respect thereto, as in the embodiment of FIG. 1, is moved rearwardly in guideway 58 when framework 14' is rotated counterclockwise as seen in FIG. 4 by actuation of hydraulic cylinder 18 for lowering conveyor 30 more angularly into the water. Guideway slots 58, 58' are fixed in alignment parallel to chord member 19' of framework 14', and guideway slot 68 (and its opposite side counterpart which is concealed from view) are aligned horizontally parallel to each other, placing them parallel to both the longitudinal axis of the portion of machine 10' which is rigidly fixed to pontoons 11, 11', and to the water surface. With the axle of paddle wheel 12' being of fixed distance from both conveyor belt 50 and from the water surface, paddle wheel 12' is always immersed the proper depth for the paddle wheel blades to be submersed optimumly for the purpose of propelling machine 10' through the water and for placing plate 54'' and its counterparts in proper position for retaining aquatic growth laid on conveyor belt 50, regardless of the depth to which the conveyor is angled.

It will be apparent that a similar, but non-preferred, mechanism may be provided wherein paddle wheel 12, mounted fixedly against translational movement, and with conveyor 13 carried tangentially to the paddle wheel on a standard rotatively mounted about the axis of the paddle wheel, is actuated for angular positioning of conveyer 13' by means such as ram 18.

I claim:
1. An aquatic-weed harvesting machine comprising in combination,
   a) a power driven paddle wheel, b) a power driven endless-belt elevator conveyor disposed substantially tangentially underlying said paddle wheel, said belt and said paddle wheel periphery being synchronized to travel at substantially uniform speed, c) means pivotally connected to the outer peripheral portion of at least one blade of said paddle wheel, said means being disposed for being rotated between a position infolded with respect to the periphery of said paddle wheel and a position radially extended from said paddle wheel, said means being moved to a radial extended position, and into pressing contact with growth laid on said conveyor belt, during the bottom portion of rotation of said paddle wheel blade in the rotation cycle of said paddle wheel, thereby to grip and maintain aquatic growth laid in place on said conveyor belt as said belt continues its movement, and to uproot bottom growth from the bed of a body of water in which said machine is being operated.

2. The machine of claim 1 wherein said means comprises a plate pivotally connected to at least one said blade of said paddle wheel.

3. The machine of claim 1 wherein said paddle wheel comprises slat configured paddles extending parallel to said paddle wheel axis and disposed adjacent to the outer peripheral extremity of said paddle wheel.

4. The machine of claim 1 wherein said means comprises a flap of rubber-like material.

5. The machine of claim 1 wherein the endless belt of said elevator conveyor comprises link belt construction with openings which enable water to freely pass therethrough.

6. The machine of claim 1 wherein said paddle wheel and said elevator conveyor are unitarily movable arcuately about a horizontal axis disposed transversely to the longitudinal axis of said machine by operator controlled power actuation.

7. The machine of claim 1 which is provided with means which enables it to float in water.

* * * * *